R. R. GASKILL.
Wheel-Cultivator.
No. 36,609. Patented Oct. 7, 1862.
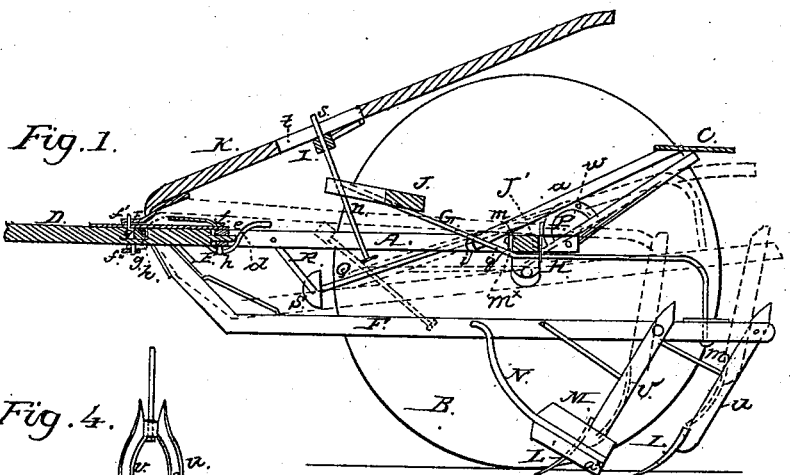
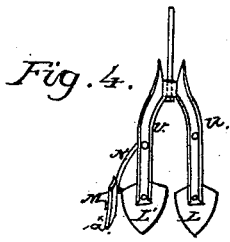
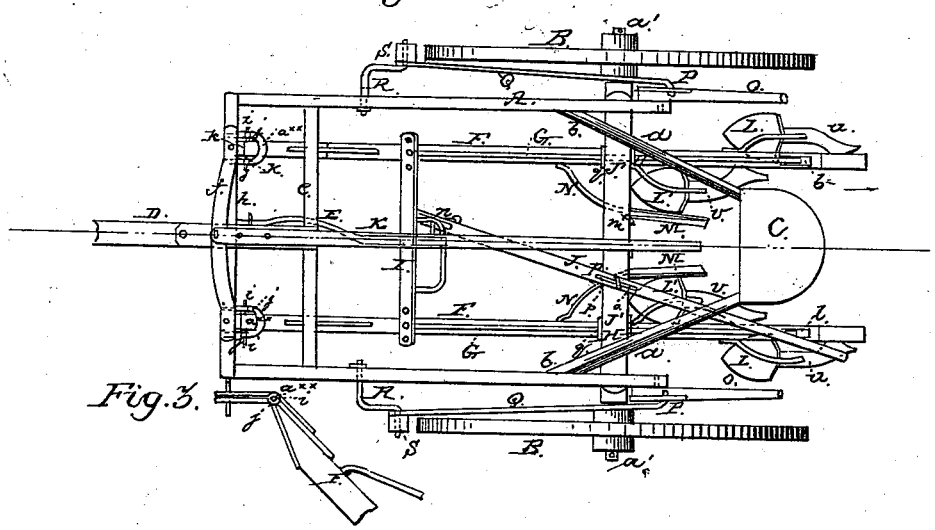
WITNESSES:
INVENTOR:
R. R. Gaskill

UNITED STATES PATENT OFFICE.

ROLAND R. GASKILL, OF WYANET, ILLINOIS.

IMPROVEMENT IN CULTIVATORS.

Specification forming part of Letters Patent No. 36,609, dated October 7, 1862.

*To all whom it may concern:*

Be it known that I, R. R. GASKILL, of Wyanet, in the county of Bureau and State of Illinois, have invented a new and Improved Cultivator; and I do hereby declare that the following is a full, clear, and exact description of the same, reference being had to the accompanying drawings, making a part of this specification, in which—

Figure 1 is a side sectional view of my invention, taken in the line $x\ x$, Fig. 2. Fig. 2 is a plan or top view of the same; Fig. 3, a detached side view of one of the joints or hinges of one of the plow-bars. Fig. 4 is a back view of the two plows at one side of the machine, with one of the shares or guards.

Similar letters of reference indicate corresponding parts in the several figures.

The object of this invention is to obtain a cultivator having its plows arranged in such a manner that they may be readily adjusted to plow to a greater or less depth and at a greater or less distance apart, as may be required, and at the same time be capable of being manipulated by the operator either while riding on the machine or walking behind it.

The invention also has for its object the ready breaking up or retarding of the wheels of the machine or the sudden stopping of the same at either side by a simple mechanism which will admit of being readily manipulated by the driver and with a view to assist the adjusting of the draft-pole to facilitate the turning of the machine, the draft-pole being adjustable in order to operate conjointly with the brake mechanism.

The invention has further for its object the protecting of the plants from clods of earth thrown up by the plows, while the fine earth is allowed to be cast up to them.

To enable those skilled in the art to fully understand and construct my invention, I will proceed to describe it.

A represents the frame of the machine, which is of rectangular form, and is supported at its back part by two wheels, B B.

C is the driver's seat, which is attached to two oblique bars, $a\ a$, the front ends of which are connected by bolts or pivots $b$ to the inner sides of the side bars, $c\ c$, of the frame A. These bolts or pivots $b$ admit of the seat being turned forward or over on the frame when the driver prefers to walk behind the machine.

D is the draft-pole, the inner end of which has a tenon, $d$, formed on it, said tenon fitting in a cross-bar, $e$, in the front part of the frame A, the tenon being allowed to work or turn freely on a pivot or pin, $f$. (See Fig. 1.) The draft-pole has a mortise, $g$, made transversely and horizontally through it. This mortise is longer than the width of the front cross-bar, $h$, of the frame A, and said cross-bar passes through the mortise, the length of the latter admitting of a certain degree of lateral play or movement of the draft-pole. The cross-bar $h$ has metal guides $f'\ f''$ attached to it, one at its upper and the other at its lower surface, and in the lower guide, $f''$, a hole, $g'$, is made to receive the end of a lever, E, which is attached to the draft-pole, and by fitting in said hole secures the draft-pole in a position at right angles with the frame A. A spring, $h'$, which is attached to the under side of the cross-bar $e$ and bears against the back part of the lever E, has a tendency to keep the same engaged with the hole $g'$.

F F are two longitudinal bars, the front parts of which incline upward at an angle of about forty-five degrees, and are connected each by a double joint or hinge, $a^{xx}$, to the front cross-bar, $h$, of the frame A. These double joints or hinges are constructed so as to admit of the bars F working up and down, and also sidewise, or laterally, forming universal joints, and this result is attained by having the pintles $i$, which pass through eyes $j$, attached to the bars F, pass through eyes $k$ at the ends of curved bars, which are pivoted in the cross-bar $h$. (See Figs. 2 and 3.) These hinges or joints, in themselves considered, are not new, having been used and applied in various ways for different purposes. The bars F F are considerably longer than the frame A, and they have rods G connected to them near their back ends. These rods G are of curved form, and extend down at their back parts through mortises $l$ in the back parts of the bars F, the latter resting on buttons $m$ on the rods G. The rods G pass through bearings H, which are permanently attached to the back side of a cross-bar, $m^x$, at the back part of the frame A. The front ends of the rod G are connected by a bar, I, which has a pendent rod, $n$, passing through a lever, J, which works on a fulcrum-pin, $o$, on the cross-bar $m^x$, the pin $o$ passing through an oblong longitudinal slot or mortise, $p$, in said lever. (See Fig. 2.) The rods G G rest against adjustable bearings J', which are attached to the front side of the cross-bar $m$ by screws $q$, passing through slots in the bearings and into the cross-bar. This mode of attachment admits of the bearings being adjusted higher or lower to suspend the bars F at a greater or less height, as may be desired. This will be fully understood by referring to Fig. 1.

K is a lever, the front end of which is attached by a pivot $r$ to the upper guide, $f''$, on the cross-bar $h$ of frame A. This lever K is connected to the bar I of the rods G by means of a pin, $s$, which is attached to the bar I and passes up through a slot, $t$, in the lever K, as shown in Figs. 1 and 2. The pin $s$ is attached at its lower end to the pendent rod $n$.

To the back parts of the bars F F there are attached four plows, L L L' L'. The back plows, L, are secured to standards $u$, which are attached to the outer sides of the bars F, while the plows L' are secured to standards $v$, which are attached to the inner sides of said bars, the plows L' being some distance in front of the plows L and nearer each other. (See Fig. 2.)

M M represent two shields or guards, which are at the back ends of rods N N, the front ends of the latter being secured to the bars F F. These shields or guards are simply metal plates, bent, as shown in Fig. 4, so as to have their lower parts inclined outward toward each other, as shown at $a^x$. The shields or guards are between the front plows, L' L'.

To the back part of each bar F there is attached a lever, O, each of which has a semicircular plate, P, secured to it, provided with one or more holes, $w$, in which the back ends of rods Q are fitted by a hooked terminal, as shown in Fig. 2. The front ends of the rods Q are connected to the lower ends of cranks R R, which are fitted to the frame A—one at each side—and have a shoe, S, at their outer ends, the shoes being in line with the treads of the wheels B, on which the frame A is mounted, the axles $a'$ of these wheels being attached to the cross-bar $m$ of frame A.

From the above description it will be seen that by depressing either lever O a brake may be applied to either wheel B, the cranks R being drawn up by depressing the levers and causing the shoes S to bear against the treads of the wheels, and it will also be seen that by depressing the back part of either lever J or K the back parts of the bars F will be raised, and consequently the plows L L', the latter, if desired, raised above the surface of the ground in order to admit of the turning of the machine, and in order to facilitate the turning of the machine the brake or shoe at either side of the machine, by operating the proper lever O, may be brought in contact with the wheel which is in line with it, and the draft-pole D thereby allowed to swing around, the lever E being freed from the lower guide, $f''$, in consequence of the bar I coming in contact with it when forced down by either lever J or K. The depth of the penetration of the plows into the earth may be regulated as desired by adjusting the bearings J' higher or lower, and by operating either lever J or K the plows may be moved laterally. The shields or guards M M prevent clods of earth from coming in contact with the plants, and at the same time fine earth is allowed to pass underneath them to the plants, the latter result being due to the lower inclined parts, $a^x$, of the shields or guards. The bars F F fall when either of the levers J or K is allowed to rise. The lever K is used when the driver is on his seat C, and the lever J is used when he is walking behind the machine. In the latter case the seat C is shoved forward, so as to be out of the way.

The bars F F may be adjusted at a greater or less distance apart by fitting the front ends of the rods G in different holes in the bar I.

Having thus described my invention, what I claim as new, and desire to secure by Letters Patent, is—

1. The plow-bars F F, secured to the front cross-bar, $h$, of the frame A by means of the double hinges or universal joints $a^x$ $a^x$, in combination with the rods G G, fitted in the bearings H, connected to the bars F F, and arranged with the adjustable bearings J', as shown, to operate as and for the purpose specified.

2. The adjustable or movable seat C, when arranged as shown and used in combination with the bars F F, rods G G, and levers J or K, as and for the purpose set forth.

3. The swinging or adjustable draft-pole D, arranged, as shown, with the holding-lever E, in combination with the brakes formed of the levers O, rods Q, and cranks R, with the shoes S attached, all arranged to operate as and for the purpose set forth.

ROLAND R. GASKILL.

Witnesses:
DAVID G. BONHAM,
LEONARD MARSH.